United States Patent [19]

Yoneda et al.

[11] Patent Number: 4,584,796
[45] Date of Patent: Apr. 29, 1986

[54] NUMERICAL CONTROL GRINDING MACHINE

[75] Inventors: Takao Yoneda, Toyoake; Yasuji Sakakibara, Hekinan, both of Japan

[73] Assignee: Toyoda Koki Kabushiki Kaisha, Kariya, Japan

[21] Appl. No.: 733,798

[22] Filed: May 14, 1985

[30] Foreign Application Priority Data

May 16, 1984 [JP] Japan .................. 59-99293
May 23, 1984 [JP] Japan ................. 59-105385

[51] Int. Cl.⁴ .......................................... B24B 49/02
[52] U.S. Cl. ........................... 51/165.71; 51/105 SP; 51/165.87; 51/289 R
[58] Field of Search .......... 51/105 SP, 165.71, 289 R, 51/327; 364/474

[56] References Cited

U.S. PATENT DOCUMENTS

| | | | |
|---|---|---|---|
| 2,294,045 | 10/1981 | Enomoto et al. | 51/165.71 |
| 4,122,635 | 10/1978 | Asano et al. | 51/165.87 |
| 4,205,488 | 6/1980 | Englander et al. | 51/105 SP |
| 4,337,599 | 7/1982 | Koide et al. | 51/289 |
| 4,490,946 | 1/1985 | Tsujiuchi et al. | 51/165.88 |
| 4,502,125 | 2/1985 | Yoneda et al. | 364/474 |

FOREIGN PATENT DOCUMENTS 51-44225 10/1976 Japan .

*Primary Examiner*—Harold D. Whitehead
*Attorney, Agent, or Firm*—Oblon, Fisher, Spivak, McClelland & Maier

[57] ABSTRACT

In a numerical control grinding machine, movements of a wheel head and a work table respectively in first and second directions perpendicular to each other are controlled by reference to first and second present position registers which respectively represent positions of cylindrical and shoulder grinding surfaces of a grinding wheel rotatably carried on the work head. A reference member is secured to the work table, and a wheel head reference point is defined on the wheel head. A memory device stores data which represents positions in the first and second directions, of the wheel head reference point relative to a workpiece rotational axis and the reference member when the wheel head and the work table are at respective original positions. The memory device further stores data which represents positions in the first and second directions, of the cylindrical and shoulder grinding surfaces relative to the wheel head reference point. When given a command after the present position registers lose their contents due to power failure or emergency stop, a central processing unit of a numerical controller for the machine calculates the present positions of the cylindrical and shoulder grinding surfaces based upon the stored data in the memory device and sets the present position registers respectively with the calculated present positions.

5 Claims, 9 Drawing Figures

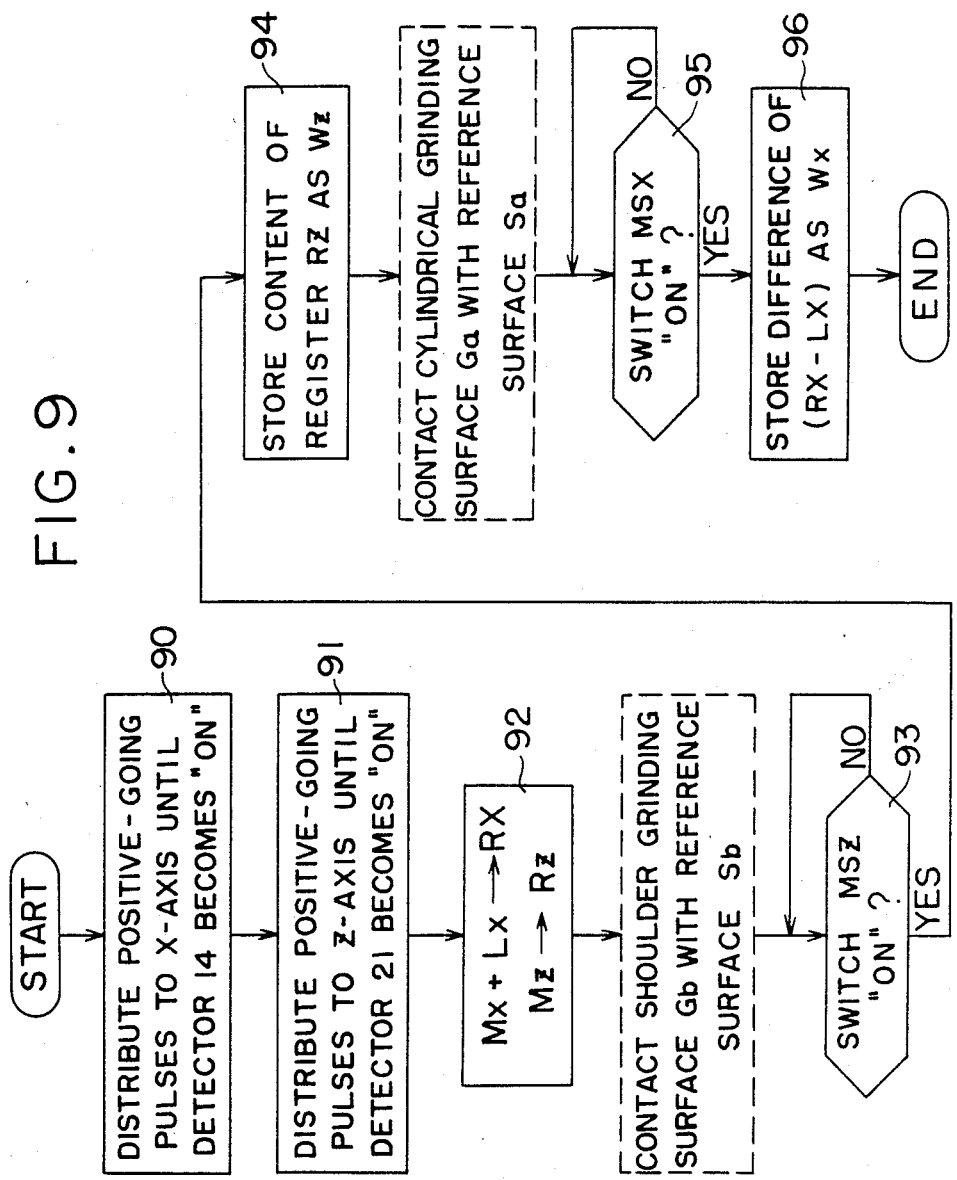

NUMERICAL CONTROL GRINDING MACHINE

BACKGROUND OF THE INVENTION

1. Field of the Invention

The present invention relates to a numerical control grinding machine of the type wherein movements of a grinding wheel head and a work table respectively in first and second directions transverse to each other are controlled by reference to the contents of first and second present position registers which respectively stores the positions of cylindrical and shoulder grinding surfaces of a grinding wheel in the first and second directions.

2. Description of the Prior Art

In numerical control grinding machines, the positions of cylindrical and shoulder grinding surfaces of a grinding wheel are gradually changed by grinding wheel dressings. Thus, not the position of a wheel head, but the positions of the grinding wheel surfaces must be precisely detected to control movements of the wheel head and a work table.

To this end, in a known numerical control grinding machine of the type mentioned above, a dressing tool is provided on a work table, and the positions of the tip of the dressing tool in first and second directions which are respectively perpendicular and parallel to a work spindle axis are measured in advance to be used as reference positions. Each time a dressing on the grinding wheel is completed, each of the present position registers is set with a corresponding one of the reference position data, with the dressing tool being engaged with a corresponding one of the grinding surfaces. This enables the contents of the present position registers to respectively represent the actual positions of the cylindrical and shoulder grinding surfaces.

However, in the known apparatus, when a power failure occurs during a machining operation, the contents of the present position registers which respectively store positions of the cylindrical and shoulder grinding surfaces are lost, and the positions of the grinding surfaces become unknown. In this event, it is necessary to perform the grinding wheel dressing manually and to set the present position registers with the reference position data determined by the dressing tool. Thus, the working property of the known apparatus is poor.

Moreover, in the known apparatus, when the position of the tip of the dressing tool is deviated from the reference position due to a wear of the dressing tool, the positions of the grinding surfaces after dressing operations are deviated from the theoretical positions. Since the present position registers are set with the predetermined reference position data even at such time, it results that the contents of the present position registers represent those deviated from the actual positions of the grinding surfaces, whereby a machining error may be involved.

SUMMARY OF THE INVENTION

Accordingly, it is a primary object of the present invention to provide an improved numerical control grinding machine capable of setting present position registers with data representing actual positions of cylindrical and shoulder grinding surfaces of a grinding wheel without performing a manual dressing of the grinding wheel after the contents of the present position registers are lost.

Another object of the present invention is to provide an improved numerical control grinding machine which enables an operator to precisely and easily set present position registers with data representing the actual positions of cylindrical and shoulder grinding surfaces of a new grinding wheel without performing troublesome arithmetic calculations after the new grinding wheel is mounted on the grinding machine in place of an old grinding wheel.

A further object of the present invention is to provide an improved numerical control grinding machine in which an error due to a wear of a dressing tool is not involved in setting present position registers with actual positions of cylindrical and shoulder grinding surfaces of a new grinding wheel which is mounted on the grinding machine in place of a life-expired grinding wheel.

Briefly, in a numerical control grinding machine according to the present invention, first and second present position registers are used for controlling movements of a wheel head and a work table respectively in first and second directions by reference to the contents thereof. A wheel head reference point is defined on the wheel head rotatably carrying a grinding wheel, and a memory device stores positions in the first and second directions, of the wheel head reference point when the wheel head and the work table are at their original positions. The memory device also stores positions in the first and second directions, of cylindrical and shoulder grinding surfaces of the grinding wheel relative to the wheel head reference point. When the contents of present position registers are lost due to power failure or emergency stop, a numerical controller for the grinding machine operates to return the wheel head and the work table to respective original positions. Then, the numerical controller calculates positions of the cylindrical and shoulder grinding surfaces based upon the position data stored in the memory device and sets the present position registers with the calculated positions. With this configuration, since positions of the cylindrical and shoulder grinding surfaces are calculated based upon the position data stored in the memory device when the wheel head and work table are at their original positions, it is unnecessary to perform a troublesome manual dressing operation for detecting the actual positions of the cylindrical and shoulder grinding surfaces.

In another aspect of the present invention, it is possible to detect the positions of cylindrical and shoulder grinding surfaces of a new grinding wheel. After the new grinding wheel is mounted on the wheel head in place of a life-expired grinding wheel, the numerical controller returns the wheel head and the work table to their original positions so as to set the present position registers with the stored positions of the wheel head reference point. The numerical controller then selectively brings the cylindrical and shoulder grinding surfaces into contact with a corresponding one of first and second reference surfaces of a reference member secured to the work table and detects the positions of the cylindrical and shoulder grinding surfaces of the new grinding wheel relative to the wheel head reference point based upon the present position registers.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of a preferred embodiment when considered in connection with the accompanying drawings, wherein like reference numerals designate identical or corresponding parts throughout views, and in which.

Figure 3:
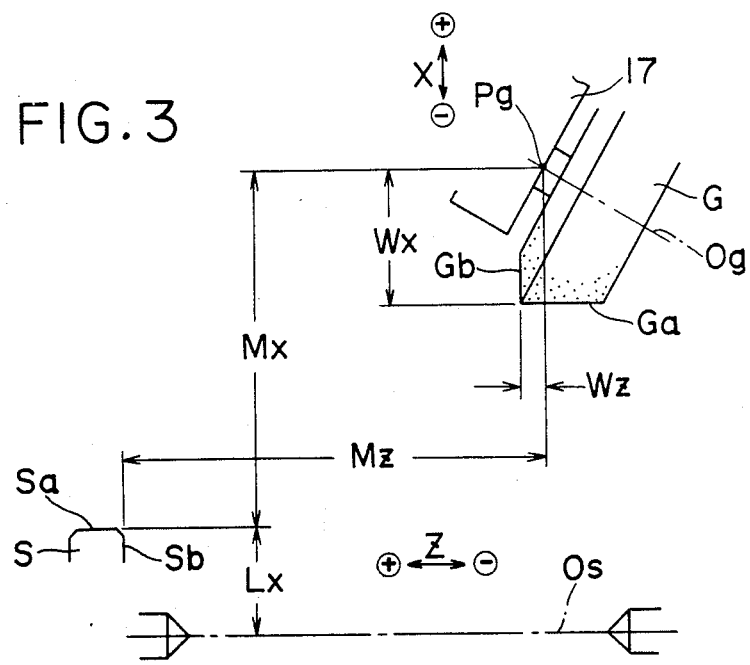
Figure 2:
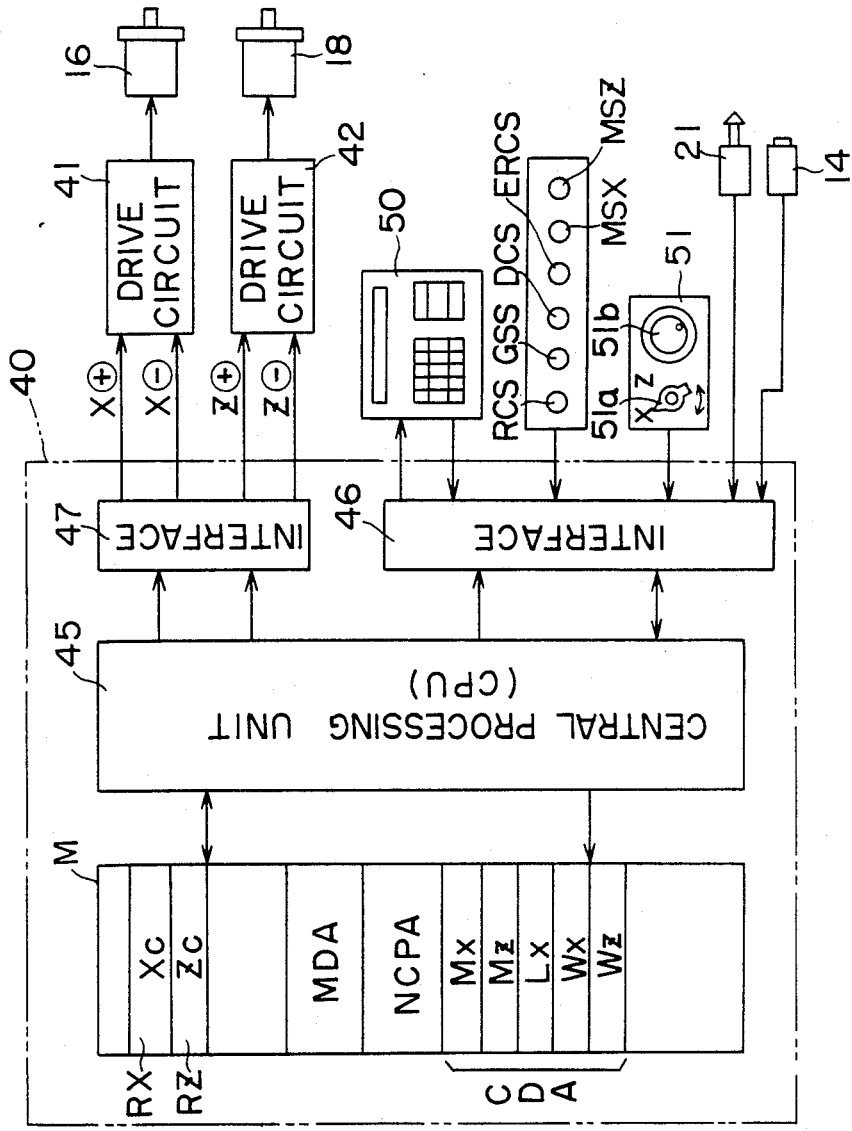
FIG. 2 is a block diagram of a control circuit for controlling the machine.
Figure 5:
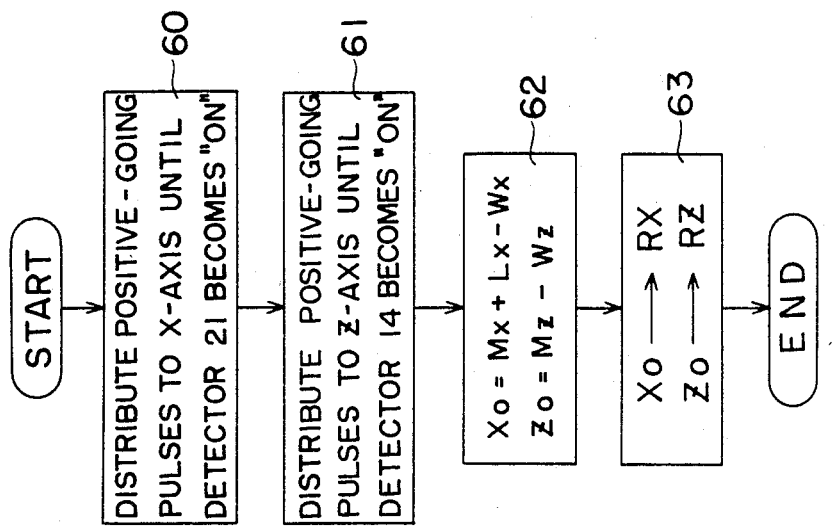
Figure 4:
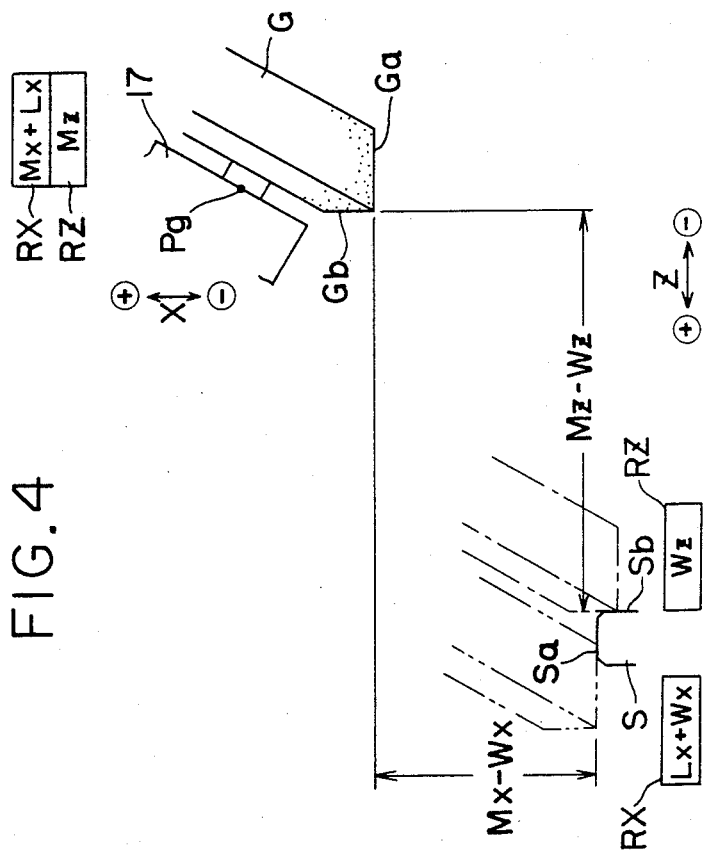
Figure 6:
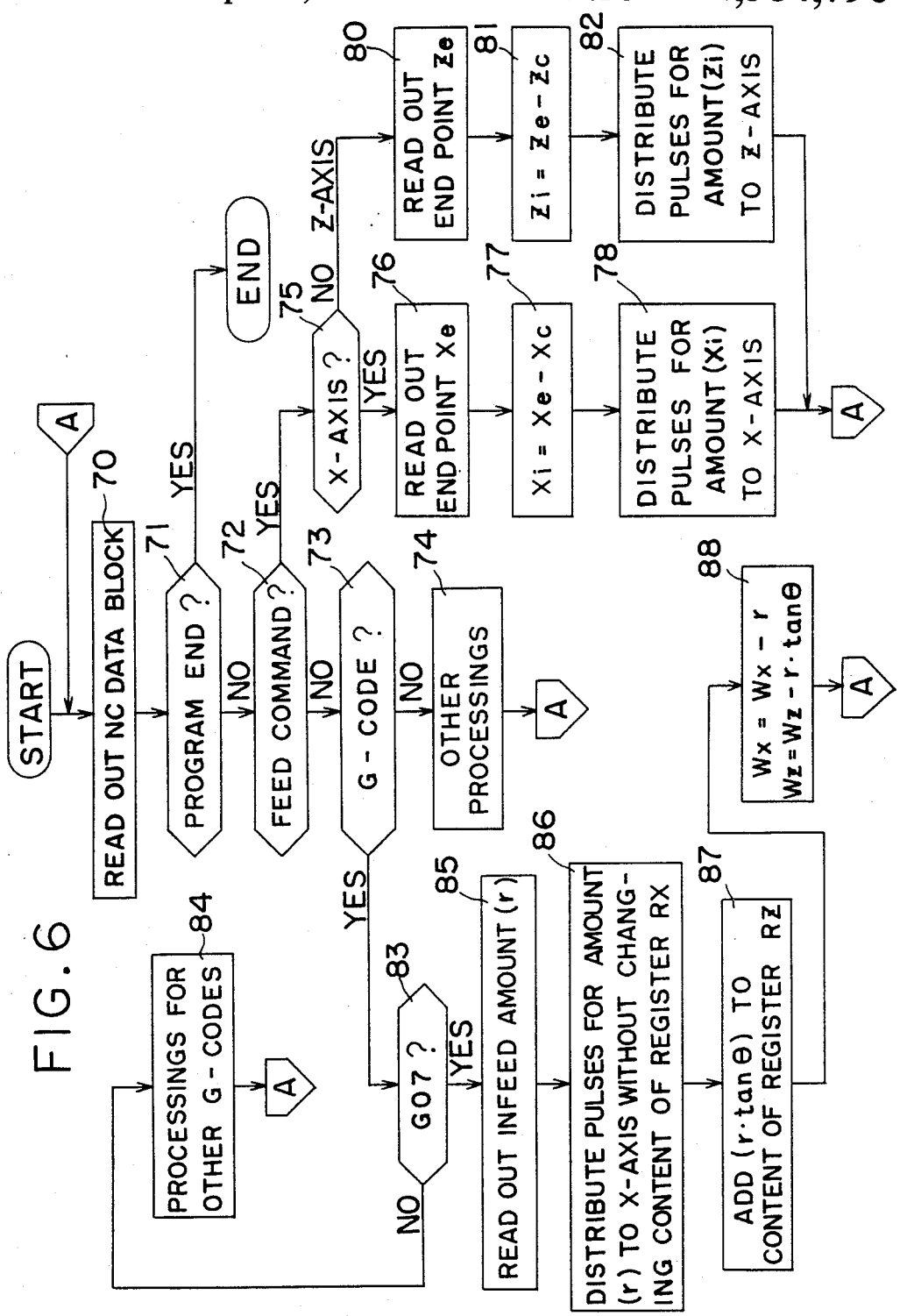
Figure 7:
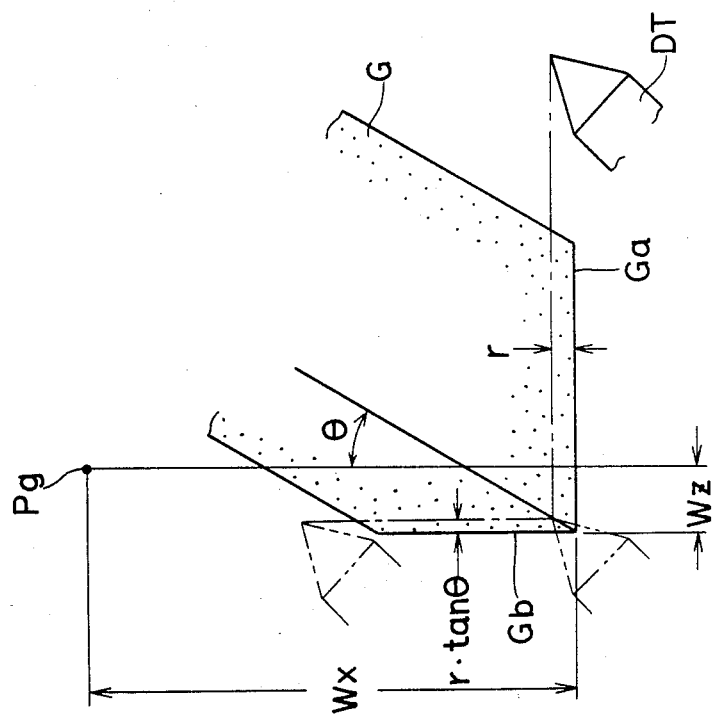
Figure 8:
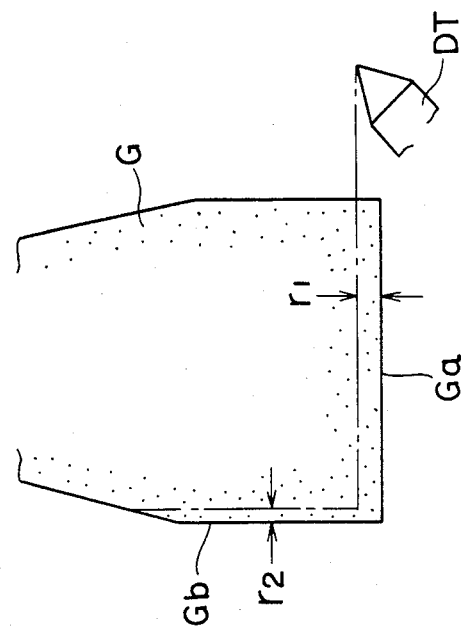

FIG. 3 explanatory view showing the positional relationship between a grinding wheel and a reference member in a state that a wheel head and a work table are at their original positions;

FIG. 4 is an explanatory view showing the positional relationship between the grinding wheel and the reference member in the case where protruding amounts Wx and Wz indicated in FIG. 3 are detected;

FIG. 5 is a flow chart of processings executed by a central processing unit shown in FIG. 2 after power failure or emergency stop;

FIG. 6 is a flow chart of processings executed by the central processing unit for controlling machining and dressing operations of the grinding machine;

FIG. 7 is an explanatory view showing the positional relation between the grinding wheel and a dressing tool in a dressing operation;

FIG. 8 is another example of the grinding wheel used in the grinding machine; and FIG. 9 is a side flow chart of processings executed by the central processing unit after the replacement of the grinding wheel with new one.

DETAILED DESCRIPTION OF THE PREFERRED EMBODIMENT

Figure 1:
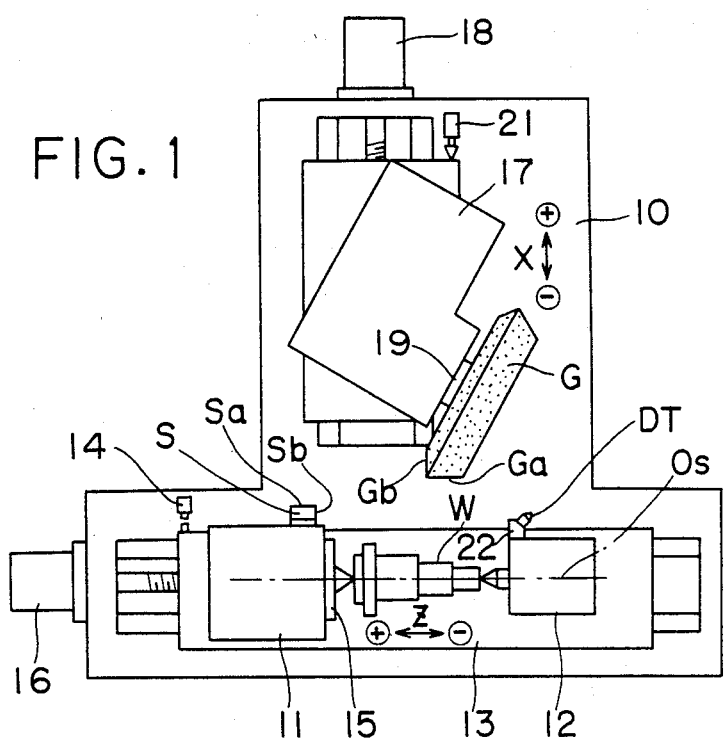
FIG. 1 is a schematic plan view of a numerical control grinding machine according to the present invention.

Referring now to the drawings and particularly to FIG. 1 thereof, a numeral 10 denotes a bed of a numerical control grinding machine, on which is mounted a work table 13 having a work head 11 and a tail stock 12 fixedly mounted thereon. A workpiece W is supported between the work head 11 and the tail stock 12 and is rotatable upon rotation of a work spindle 15 connected to a spindle drive motor, not shown. The work table 13 is connected to a servomotor 16 through a feed screw mechanism, not numberd, and is movable in a Z-axis direction parallel to a work spindle axis Os. A numeral 14 denotes a Z-axis origin detector for detecting the arrival of the work table 13 at the original position.

On the other hands, the bed 10 has mounted at its rear top portion a wheel head 17, which is movable in an X-axis direction transverse to the work spindle axis Os. Feed movement of the wheel head 17 is controllable by a servomotor 18 through a feed screw mechanism, not numbered, connected thereto. On the wheel head 17, a grinding wheel G having a cylindrical grinding surface Ga parallel to the work spindle axis Os and a shoulder grinding surface Gb perpendicular to the cylindrical grinding surface Ga is rotatably carried through a wheel spindle 19, which is rotatable about an axis extending at an acute angle with the work spindle axis Os, and is rotatable by a wheel drive motor, not shown. An X-axis origin detector 21 is provided at the rear portion of the bed 10 for detecting the returning of the wheel head 17 to the original position.

A diamond dressing tool DT is attached to a rear side of the tail stock 12 near the wheel head 17 through a dresser holder 22, and is used to dress the grinding wheel G. A reference member S is attached to a rear side of the work head 11 near the wheel head 17 and is formed with a first reference surface Sa parallel to the work spindle axis Os and a second reference surface Sb transverse to the work spindle axis Os.

Referring to FIG. 2 showing a control circuit for controlling the grinding machine as constructed above, there is provided a numerical controller 40 for controlling the machining of the workpiece W and the dressing of the grinding wheel G by distributing pulses to drive circuits 41, 42 which respectively drive the above-noted servomotors 16, 18. The numerical controller 40 is composed of a central processing unit (hereafter referred to as "CPU") 45, a memory device M and interfaces 46, 47 connected to the CPU 45. The interface 46 is coupled to a data input device 50, command switches RCS to MSZ for instructing the initiation of a machining operation and so forth, a manual pulse generator 51, and the origin detectors 14 and 21, while the interface 47 is coupled to the drive circuits 41 and 42.

The memory device M is formed therein with a pair of present position registers RX and RZ for respectively storing the X and Z-axis positions of the cylindrical grinding surface Ga and the shoulder grinding surface Gb of the grinding wheel G, in addition to a machining data area MDA, an NC program area NCPA and a control data area CDA. The memory areas MDA, NCPA and CDA are constructed by one or more random access memories backed up by batteries. Data such as indexing positions of the work table 13, finish sizes and rough grinding end sizes of workpiece surfaces to be machined, and the like have been written in the machining data area MDA by means of the data input device 50.

Further, a numerical control program (hereafter referred to as "NC program") for a workpiece grinding cycle and another NC program for grinding wheel dressing have been written by means of the data input device 50 in the NC program area NCPA. Similarly, data which indicate a positional relation between the wheel head 17 and the reference member S in a state that the wheel head 17 has been returned to the original position have been stored in the control data area CDA.

More specifically, as shown in FIG. 3, an intersecting point which the axis Og of the grinding wheel G makes with a lateral surface of the wheel head 17 is defined as a wheel head reference point Pg indicating the position of the wheel head 17. The control data area CDA stores a distance Mx in the X-axis direction between the wheel head reference point Pg and the first reference surface Sa of the reference member S and a distance Mz in the Z-axis direction between the wheel head reference point Pg and the second reference surface Sb in the state that the wheel head 17 and the work table 13 are at the respective original positions. The control data area CDA also stores a distance Lx in the X-axis direction between the work spindle axis Os and the first reference surface Sa of the reference member S in addition to a protruding amount Wx in the X-axis direction of the cylindrical grinding surface Ga relative to the wheel head reference point Pg and a protruding amount Wz in the Z-axis direction of the shoulder grinding surface Gb relative to the wheel head reference point Pg.

The operation of the numerical control grinding machine as constructed above will now be described primarily as to the operation of the CPU 45.

(i) Original Position Returning Operation

When the operation is to be re-started after an emergency stop, or when the operation is to be started in the morning, the command switch RCS is depressed to give the CPU 45 a command for the returning of the wheel head 17 to the original position.

In response thereto, the CPU 45 executes a program shown in FIG. 5 so as to position the wheel head 17 and the work table 13 to the respective original positions as shown in FIG. 1. This can be done by distributing positive-going pulses to the X and Z-axes until the origin detectors 21 and 14 for the axes are actuated. (steps 60 and 61) Then, the CPU 45 performs calculations of equations (1) and (2) noted below (step 62), and the results X0 and Z0 of such calculations are respectively set in the X and Y-axis present position registers RX and RZ.

$$X0 = Mx + Lx - Wx \quad (1)$$

$$Z0 = Mz - Wz \quad (2)$$

Thus, the content of the present position register Rx exactly represents the retraction amount of the cylindrical grinding surface Ga from the work spindle axis Os, i.e., the position of the cylindrical grinding surface Ga in the X-axis direction in the state that the wheel head 17 has been returned to the original position. Likewise, the content of the present position register Rz exactly represents the position of the shoulder grinding surface Gb relative to the second reference surface Sb in the Z-axis direction in the state that the work table 13 has been returned to the original position.

When the wheel head 17 and the work table 13 are thereafter moved in accordance with the numerical control program, the contents of the registers RX and RZ are varied in correspondence to feed amounts of the wheel head 17 and the work table 13 respectively, so that they are able to exactly represent the present positions of the cylindrical grinding surface Ga and the shoulder grinding surface Gb in the X and Z-axis directions, respectively.

(ii) Machining and Grinding Wheel Dressing Operations

When the CPU 45 is given a machining command upon depression of the machining start switch GSS, it selects the NC program for the machining of a workpiece W from those stored in the NC program area NCPA and executes processings shown in FIG. 6 for the selected NC program. When each program data block read out in step 70 includes a feed command for any of the X and Y-axes, the present position Xc (Zc) of the cylindrical (shoulder) grinding surface Ga (Gb) stored in the present position register RX (RZ) is subtracted from programmed end point data Xe (Ze) to calculate an incremental feed amount Xi (Zi) in step 77 (81), and a pulse distribution processing is performed based upon the incremental feed amount Xi (Zi) in step 78 (82).

When a wheel dressing command switch DCS is depressed, the CPU 45 selectively reads out the NC program for grinding wheel dressing and executes the processings shown in FIG. 6 for the read-out NC program.

The NC program for grinding wheel dressing is programmed to position the dressing tool DT to a position where the dressing tool DT is given an infeed (r) against the cylindrical grinding surface Ga, then to displace the work table 13 to a position where the dressing tool DT engages a corner edge of the grinding wheel G, and finally, to retract the dressing tool DT along the shoulder grinding surface Gb relative thereto, as shown in FIG. 7. Accordingly, the infeed amount of the dressing tool DT against the shoulder grinding surface Gb is set to be (r·tan $\theta$) where the angle which a vertical plane encompassing the corner edge of the grinding wheel G makes with the X-axis is represented by a symbol "$\theta$".

The numerical control program for grinding wheel dressing includes a position compensation command G-code G07 at its last data block. When the G-code G07 is read out in step 70 of FIG. 6, the CPU 45 in step 85 reads out data which is programmed next to the G-code G07 for defining the infeed amount (r) of the dressing tool DT against the cylindrical grinding surface Ga, and in step 86, distributes negative-going compensation pulses of the number corresponding to the infeed amount (r) to the X-axis. During the distribution of the compensation pulses, the present position register RX is prevented from changing its content, and the wheel head 17 only is advanced by the infeed amount (r). Thus, the position of the cylindrical grinding surface Ga indicated by the present position register RX comes into coincidence with the actual position of the cylindrical grinding surface Ga. Subsequently, a value (r·tan $\theta$) is added to the present position Zc being stored in the register RZ, so that the position of the shoulder grinding surface Gb indicated by the register RZ comes into coincidence with the actual position of the shoulder grinding surface Gb.

After the positions of the cylindrical and shoulder grinding surfaces Ga, Gb are changed by the wheel dressing, the protruding amounts Wx and Wz of the cylindrical and shoulder grinding surfaces Ga and Gb relative to the wheel head reference point Pg are also changed in step 88. That is, the stored values Wx, Wz of the protruding amounts are modified by the infeed amounts (r), (r·tan $\theta$) to make the protruding amounts Wx, Wz in the control data area CDA respectively indicate the actual positions of the cylindrical and shoulder grinding surfaces Ga and Gb after the dressing. Consequently, when the aforementioned original position returning operation is performed after the dressing operation is performed many times, the X-axis coordinate value X0 and the Z-axis coordinate value Z0 which represent the positions of the cylindrical and shoulder grinding surfaces Ga, Gb in the state that the wheel head 17 and the work table 13 have been returned to the original positions are calculated based upon the modified protruding amounts Wx, Wz. It is therefore possible to precisely detect the positions of the cylindrical and shoulder grinding surfaces Ga, Gb although the positions of the cylindrical and shoulder grinding surfaces Ga, Gb are changed by the grinding wheel dressing.

Further, the contents Xc, Zc of the present position registers RX and RZ may be lost by the power failure or the machine stop at the end of a daily work. In this case, by performing the above-noted original position returning operation only, the initial settings of the present position registers RX and RZ are executed to enable these registers to indicate the actual positions of the cylindrical and shoulder grinding surfaces Ga, Gb whose positions have been changed by the grinding wheel dressings. Consequently, the contents Xc, Zc of the present position registers RZ and RX are brought into coincidence with the actual positions of the grinding surfaces Ga and Gb, whereby the working property can be improved.

Although the angle type grinding wheel G is used in the aforementioned embodiment, the present invention may be applied to a numerical control grinding machine which employs a straight type grinding wheel as shown in FIG. 8. In this case, because a predetermined relationship is not established between an infeed amount (r1) against the cylindrical grinding surface Ga and an infeed amount (r2) against the shoulder grinding surface Gb, the infeed amounts r1 and r2 are programmed next to the G-code G07 in the numerical control program for grinding wheel dressing, and protruding amounts Wx and Wz are modified by the infeed amounts r1 and r2 so as to obtain the same results as in the case of the angle type grinding wheel.

(iii) Operation after Grinding Wheel Replacement

After the grinding wheel G is changed with a new one, the protruding amounts Wx, Wz of the cylindrical and shoulder grinding surfaces Ga, Gb of the new grinding wheel G relative to the wheel head reference point Pg are unknown. For this reason, the protruding amounts Wx and Wz are detected by the following operation to be set in the control data area CDA.

In this case, an operator depresses a command switch ERCS for post-replacement original position returning after mounting the new grinding wheel G on the wheel spindle 19. In response to this, the CPU 45 executes a program shown in FIG. 9, wherein it distributes pulses to return the wheel head 17 and the work table 13 in steps 90 and 91 and then in step 92, sets the present position registers Rx and Rz with respectively values Mx+Lx, Mz, as shown in FIG. 4. As seen in FIG. 3, these values Mx, Lx and Mz respectively indicate a distance in the X-axis direction between the first reference surface Sa and the wheel head reference point Pg, a distance in the X-axis direction between the first reference surface Sa and the work spindle axis Os and a distance in the Z-axis direction between the second reference surface Sb and the wheel head reference point Pg in the state that the work table 13 and the wheel head 17 have been returned to their original positions.

Thereafter, the operator manipulates an axis selector switch 51a and a pulse generating handle 51b of the manual pulse generator 51 to move the work table 13 and the wheel head 17 until the shoulder grinding surface Gb of the grinding wheel G not rotating is brought into slight contact with the second reference surface Sb of the reference member S.

It is to be noted that the memory device M has stored therein a program which enables the CPU 45 to distribute pulses supplied from the pulse generating handle 51b to one of the X and Z-axes designated by the axis selector switch 51a.

As mentioned earlier, the present position register Rz is set with the distance Mz when the work table 13 is at the original position. Accordingly, if the shoulder grinding surface Gb is perfectly in alignment with the wheel head reference point Pg in the Z-axis direction, the value in the present position register Rz becomes zero when the shoulder grinding surface Gb is brought into contact with the second reference surface Sb. However, since the shoulder grinding surface Gb is spaced by the protruding amount Wz from the wheel head reference point Pg, the distance of the shoulder grinding surface Gb from the original position is reduced to a distance (Mz−Wz), so that the content of the present position register Rz becomes equal to the protruding amount Wz of the shoulder grinding surface Gb from the wheel head reference point Pg, as shown in FIG. 4.

Consequently, when a storage command switch MSZ is depressed by the operator in step 93, the central processing unit 45 in the step 94 stores in the control data area CDA the content Wz of the present position register RZ as the protruding amount of the shoulder grinding surface Gb in the Z-axis direction.

Following this, the operator manipulates the manual pulse generator 51 again so that the cylindrical grinding surface Ga of the grinding wheel G not rotating is brought into slight contact with the first reference surface Sa of the reference member S, and then, depresses another storage command switch MSX in step 95.

If the cylindrical grinding surface Ga is in alignment with the wheel head reference point Pg in the X-axis direction, the value in the present position register Rx indicates the distance Lx when the cylindrical grinding surface Ga is brought into contact with the first reference surface Sa. However, since the cylindrical grinding surface Ga of the new grinding wheel G is protruded an amount Wx from the wheel head reference point Pg, the content of the present position register Rx becomes Lx+Wx. Accordingly, upon depression of another storage command switch MSX, the CPU 45 in step 96 calculates the protruding amount Wx by subtracting the distance Lx from the content of the present position register RX and stores the calculated protruding amount Wx in the control data area CDA.

In this manner, the protruding amounts Wx and Wz of the cylindrical and shoulder grinding surfaces Ga, Gb from the wheel head reference point Pg are precisely measured by reference to the first and second reference surfaces Sa and Sb of the reference member S. Therefore, by performing the aforementioned original position returning operation, the positions of the cylindrical and shoulder grinding surfaces Ga, Gb can be precisely detected even after the replacement of the grinding wheel G with new one, thereby resulting in permitting the machining to be done accurately.

Obviously, numerous modifications and variations of the present invention are possible in light of the above teachings. It is therefore to be understood that within the scope of the appended claims, the present invention may be practiced otherwise than as specifically described herein.

What is claimed is:

1. In a numerical control grinding machine having a wheel head movable in a first direction and rotatably carrying a grinding wheel, a work table movable in a second direction perpendicular to said first direction and carrying a workpiece rotatable about an axis extending in said second direction, a first present position register for storing the position of a cylindrical grinding surface of said grinding wheel in said first direction, a second present position register for storing the position of a shoulder grinding surface of said grinding wheel in said second direction, and feed control means for controlling movements of said wheel head and said work table by reference to said positions stored in said first and second present position registers, the improvement comprising:

first memory means for storing original positions of said wheel head and said work table;
second memory means for storing protruding amounts in said first and second directions, of said cylindrical and shoulder grinding surfaces relative to a wheel head reference point defined on said wheel head;

first calculation means for compensating said protruding amounts stored in said second memory means respectively for dressing infeed amounts against said cylindrical and shoulder grinding surfaces each time said grinding wheel is dressed;

second calculation means for compensating said original positions stored in said first memory means respectively for said protruding amounts stored in said second memory means; and data setting means for setting said first and second present position registers respectively with said original positions compensated by said second calculation means each time said wheel head and said work table are respectively returned to said original positions.

2. A numerical control grinding machine as set forth in claim 1, further comprising:

a reference member secured to said work table and having first and second reference surfaces respectively parallel to said cylindrical and shoulder grinding surfaces for engagement therewith;

manual feed means manually operable for moving said wheel head and said work table so that said cylindrical and shoulder grinding surfaces of said grinding wheel are selectively brought into slight contact with an associated one of said first and second reference surfaces;

storage command means manually operable for generating a storage command;

first detection means responsive to said storage command for detecting the protruding amount of said cylindrical grinding surface relative to said wheel head reference point when said cylindrical grinding surface is in slight contact with said first reference surface of said reference member and for storing said detected protruding amount in said second memory means in place of a corresponding one of said protruding amounts; and second detection means responsive to said storage command from said storage command means for detecting the protruding amount of said shoulder grinding surface relative to said wheel head reference point when said shoulder grinding surface is in slight contact with said second reference surface of said reference member and for storing said detected protruding amount in said second memory means in place of the other of said protruding amounts.

3. In a numerical control grinding machine having a wheel head movable in a first direction and rotatably carrying a grinding wheel, a work table movable in a second direction perpendicular to said first direction and carrying a workpiece rotatable about an axis extending in said second direction, a first present position register for storing the position of a cylindrical grinding surface of said grinding wheel in said first direction, a second present position register for storing the position of a shoulder grinding surface of said grinding wheel in said second direction, and feed control means for controlling movements of said wheel head and said work table by reference to said positions stored in said first and second present position registers, the improvement comprising:

a reference member secured to said work table and having first and second reference surfaces respectively parallel to said cylindrical and shoulder grinding surfaces for engagement therewith;

memory means for storing the following data (a) through (e)

(a) a first distance between said cylindrical grinding surface and a wheel head reference point defined on said wheel head in said first direction, (b) a second distance between said shoulder grinding surface and said wheel head reference point in said second direction, (c) a third distance between said rotational axis of said workpiece and said first reference surface in said first direction, (d) a fourth distance between said wheel head reference point and said first reference surface in said first direction when said wheel head is at its original position, and (e) a fifth distance between said wheel head reference point and said second reference surface in said second direction when said work table is at its original position;

a first switch manually operable for generating an original position return command after the contents stored in said first and second present position registers are lost;

returning control means responsive to said original position return command for moving said wheel head and said work table respectively to their original positions;

calculation means for calculating the position of said cylindrical grinding surface based upon said first, third and fourth distances stored in said memory means and for calculating the position of said shoulder grinding surface based upon said second and fifth distances stored in said memory means; and data setting means for setting said first and second present position registers respectively with the positions of said cylindrical and shoulder grinding surfaces calculated by said calculation means.

4. A numerical control grinding machine as set forth in claim 3, further comprising:

compensation means for compensating said first and second distances stored in said memory means respectively for infeed amounts against said cylindrical and shoulder grinding surfaces when said grinding wheel is dressed.

5. A numerical control grinding machine as set forth in claim 3, further comprising:

manual feed means manually operable for moving said wheel head and said work table so that said cylindrical and shoulder grinding surfaces of said grinding wheel are selectively brought into slight contact with an associated one of said first and second reference surfaces;

storage command means manually operable for generating first and second storage commands;

first data revision means responsive to said first storage command for calculating the difference between the content of said first present position register when said cylindrical grinding surface is in slight contact with said first reference surface and said third distance and for setting said calculated difference as said first distance in said memory means; and second date revision means responsive to said second storage command for setting the content of said second present position register when said shoulder grinding surface is in slight contact with said second reference surface, as said second distance in said memory means.

* * * * *